United States Patent [19]
Grimm

[11] Patent Number: 6,127,469
[45] Date of Patent: Oct. 3, 2000

[54] HIGH CLARITY CARBOXYLATED NITRILE RUBBER

[75] Inventor: Donald Charles Grimm, Akron, Ohio

[73] Assignee: Zeon Chemicals L.P., Louisville, Ky.

[21] Appl. No.: 09/366,234

[22] Filed: Aug. 3, 1999

Related U.S. Application Data

[62] Division of application No. 08/766,449, Dec. 12, 1996, Pat. No. 5,990,215.
[60] Provisional application No. 60/008,738, Dec. 13, 1995.

[51] Int. Cl.$^7$ .......................................... C08K 5/10
[52] U.S. Cl. ........................... 524/311; 524/321; 524/322; 524/773
[58] Field of Search .................................... 524/311, 321, 524/322, 773

[56] References Cited

U.S. PATENT DOCUMENTS 4,529,766   7/1985   Starmer ................................... 524/310

*Primary Examiner*—Peter D. Mulcahy
*Attorney, Agent, or Firm*—Armstrong, Westerman, Hattori, McLeland & Naughton

[57] ABSTRACT

The present invention relates to a high clarity water sensitive carboxylated nitrile rubber composition which is particularly useful in making photopolymer formulations for printing plates utilized in flexographic printing applications. The present invention more specifically discloses a high clarity water sensitive carboxylated nitrile rubber composition which is comprised of (a) a carboxylated nitrile rubber which is comprised of repeat units which are derived from about 30 weight percent to about 60 weight percent 1,3-butadiene, from about 30 weight percent to about 50 weight percent acrylonitrile, and from about 10 weight percent to about 20 weight percent methacrylic acid, and (b) from about 1 to about 10 phr of at least one organic acid which contains at least three carboxyl groups. The carboxylated nitrile rubber of this invention will typically have a Mooney ML-4 viscosity of less than about 80. In applications where improved scorch safety is required the rubber composition will also contain from about 0.1 phr to about 7 phr of at least one oligomerized fatty acid.

20 Claims, No Drawings

HIGH CLARITY CARBOXYLATED NITRILE RUBBER

This is a Divisional of application Ser. No. 08/766,449, filed on Dec. 12, 1996, U.S. Pat. No. 5,990,215. This application claims the benefit of U.S. Provisional Application No. 60/008,738, filed on Dec. 13, 1995.

BACKGROUND OF THE INVENTION

It is important for photopolymer compositions utilized in making printing plates to have a high degree of clarity so that ultra-violet light which is transmitted through a photographic negative can penetrate the composition and initiate cure. It is also critical for the photopolymer composition to exhibit a high degree of water swell which allows for easy scrub-off of that part of the printing plate which was not cured. There are also certain mechanical requirements needed from such photopolymer compositions.

U.S. Pat. No. 4,045,231 discloses the utilization of polystyrene-polybutadiene-polystyrene triblock polymers in printing plates. U.S. Pat. No. 4,162,919 discloses the employment of styrene-isoprene diblock polymers and styrene-isoprene diblock polymers in flexographic printing plates. U.S. Pat. No. 5,344,743 discloses flexographic photosensitive printing plates which are made with formulations comprising triblock polymers of poly(vinylpyridine)-poly(butadiene) or poly(isoprene)-poly(vinylpyridine).

Certain carboxylated nitrile rubbers, such as Chemigum® NX775 carboxylated nitrile rubber which is sold by The Goodyear Tire & Rubber Company, offer most of the physical requirements needed from a base polymer for printing plate photopolymer compositions. However, such carboxylated nitrile rubbers do not have adequate clarity and are too water resistant for utilization in such applications. It is also important for carboxylated nitrile rubbers utilized in such applications to have a Mooney ML-4 viscosity of less than about 80.

U.S. Pat. No. 4,415,690, U.S. Pat. No. 4,435,535, and U.S. Pat. No. 4,452,936 disclose techniques for preparing carboxylated nitrile rubbers which are suitable for utilization in making printing plate photopolymer compositions but for their inadequate clarity and water swell characteristics. U.S. Pat. No. 4,415,690 discloses the utilization of succinic anhydride derivatives as scorch inhibiting agents. U.S. Pat. No. 4,435,535 discloses the utilization of adipic acid as a scorch inhibiting agent, and U.S. Pat. No. 4,452,936 discloses the utilization of oligomerized fatty acids as scorch inhibiting agents.

SUMMARY OF THE INVENTION

It been determined that carboxylated nitrile rubber which is suitable for utilization as a base polymer for printing plate photopolymer compositions can be made by utilizing the process of this invention. This process differs from the process disclosed in U.S. Pat. No. 4,452,936 in several critical respects. For instance, the level of methacrylic acid incorporated into the carboxylated nitrile rubber is increased so as to be within the range of about 10 weight percent to about 20 weight percent. It is also critical for the coagulation process carried out in recovering the carboxylated nitrile rubber from the latex to be accomplished without utilizing polyelectrolytes, such as Nalco™ 108 polyelectrolyte, as coagulation aids. The utilization of at least one organic acid which contains at least three carboxyl groups, such as citric acid, in the carboxylated nitrile rubbers of this invention is also critical. The organic acid can be added to the latex of the carboxylated nitrile rubber before coagulation or it can be added to the dry rubber after coagulation.

The present invention more specifically discloses a high clarity water sensitive carboxylated nitrile rubber composition which is comprised of (a) a carboxylated nitrile rubber which is comprised of repeat units which are derived from about 30 weight percent to about 60 weight percent 1,3-butadiene, from about 30 weight percent to about 50 weight percent acrylonitrile, and from about 10 weight percent to about 20 weight percent methacrylic acid, and (b) from about 1 to about 10 phr of at least one organic acid which contains at least three carboxyl groups. The carboxylated nitrile rubber of this invention will typically have a Mooney ML-4 viscosity of less than about 80. In applications where scorch resistance is required the carboxylated nitrile rubber composition will also contain from about 0.1 phr to about 7 phr of at least one oligomerized fatty acid.

The present invention further reveals a process for preparing a high clarity water sensitive carboxylated nitrile rubber composition which comprises the steps of (1) free radical polymerizing from about 30 weight percent to about 60 weight percent 1,3-butadiene, from about 30 weight percent to about 50 weight percent acrylonitrile, and from about 10 weight percent to about 20 weight percent methacrylic acid in an aqueous polymerization medium in the presence of at least one emulsifier to produce a carboxylated nitrile rubber latex; (2) adjusting the pH of the carboxylated nitrile rubber latex to above 4 by the addition of a base to produce a pH adjusted carboxylated nitrile rubber latex; (3) distributing at least one saponified oligomerized fatty acid throughout the pH adjusted carboxylated nitrile rubber latex to produce a saponified oligomerized fatty acid containing pH adjusted carboxylated nitrile rubber latex; (4) coagulating the saponified oligomerized fatty acid containing pH adjusted carboxylated nitrile rubber latex by the addition of a combination of coagulating agents which consists essentially of at least one strong inorganic acid, calcium chloride, and at least one organic acid which contains at least three carboxyl groups, to separate wet carboxylated nitrile rubber composition from an aqueous phase; and (5) drying the wet carboxylated nitrile rubber composition to produce said high clarity water sensitive carboxylated nitrile rubber composition.

The organic acid is used to keep the Mooney ML-4 viscosity of the carboxylated nitrile rubber composition below about 80. The Mooney ML-4 viscosity of the carboxylated nitrile rubber composition of will typically be within the range of about 30 to about 70. The Mooney ML-4 viscosity of the carboxylated nitrile rubber composition will preferably be within the range of about 40 to about 60.

DETAILED DESCRIPTION OF THE INVENTION

Carboxylated nitrile rubbers contain repeat units which are derived from 1,3-butadiene, acrylonitrile, and methacrylic acid. They can be synthesized by the free radical terpolymerization of the 1,3-butadiene, acrylonitrile, and methacrylic acid monomers under emulsion polymerization conditions. Such emulsion polymerizations generally utilize a charge composition which is comprised of water, the monomers, an initiator, and an emulsifier (soap). The emulsions polymerizations of this invention can be conducted over a very wide temperature range from about 0° C. to as high as about 100° C. It is normally preferred for the emulsion polymerizations of this invention to be carried out at a temperature which is within the range of about 5° C. to about 60° C. It is generally more preferred for the emulsion polymerization to be conducted at a temperature which is within the range of about 15° C. to about 30° C.

The ratio of monomers utilized in the charge composition can vary. However, the monomer charge composition will normally contain from about 30 to about 73 weight percent 1,3-butadiene, from about 20 to about 50 weight percent acrylonitrile, and from about 7 to about 20 weight percent methacrylic acid. The monomer charge composition will more typically contain from about 40 to about 52 weight percent 1,3-butadiene, from about 36 to about 44 weight percent acrylonitrile, and from about 12 to about 16 weight percent methacrylic acid. The monomer charge composition will preferably contain from about 43 to about 49 weight percent 1,3-butadiene, from about 38 to about 42 weight percent acrylonitrile, and from about 13 to about 15 weight percent methacrylic acid.

The charge composition used in the preparation of the latices of this invention will contain a substantial quantity of water. The ratio between the total amount of monomers present in the charge composition and water can range between about 0.2:1 and about 1.2:1. It is generally preferred for the ratio of monomers to water in the charge composition to be within the range of about 0.8:1 and about 1.1:1. For instance, it is very satisfactory to utilize a ratio of monomers to water in the charge composition of about 1:1.

The charge composition will also normally contain from about 0.5 phm (parts per hundred parts by weight of monomer) to about 6 phm of at least emulsifier. It is normally preferred for the emulsifier to be present in the polymerization medium at a level within the range of about 1 phm to about 5 phm. It is generally more preferred for the charge composition to contain from about 2 to about 4 phm of the emulsifier.

The emulsifiers used in the polymerization of this invention may be charged at the outset of the polymerization or may be added incrementally or by proportioning as the reaction proceeds. Generally, anionic emulsifier systems provide good results; however, any of the general types of anionic, cationic or nonionic emulsifiers may be employed in the polymerization.

Among the anionic emulsifiers that can be employed in the emulsion polymerizations of this invention are fatty acids and their alkali metal soaps such as caprylic acid, capric acid, pelargonic acid, lauric acid, undecylic acid, myristic acid, palmitic acid, margaric acid, stearic acid, arachidic acid, and the like; amine-soaps of fatty acids such as those formed from ammonia, mono- and dialkyl amines, substituted hydrazines, guanidine and various low molecular weight diamines; chain-substituted derivatives of fatty acids such as those having alkyl substituents; napthenic acids and their soaps and the like; sulfuric esters and their salts, such as the tallow alcohol sulfates, coconut alcohol sulfates, fatty alcohol sulfates, such as oleyl sulfate, sodium lauryl sulfate and the like; sterol sulfates; sulfates of alkylcyclohexanols, sulfation products of lower polymers of ethylene as $C_{10}$ to $C_{20}$ straight chain olefins and other hydrocarbon mixtures, sulfuric esters of aliphatic and aromatic alcohols having intermediate linkages, such as ether, ester or amide groups such as alkylbenzyl (polyethyleneoxy) alcohols, the sodium salt of tridecyl ether sulfate; alkane sulfonates, esters and salts, such as alkylchlorosulfonates with the general formula $RSO_2Cl$, wherein R is an alkyl group having from 10 to 20 carbon atoms and alkylsulfonates with the general formula $RSO_2$—OH, wherein R is an alkyl group having from 1 to 20 carbon atoms; sulfonates with intermediate linkages such as ester and ester-linked sulfonates such as those having the formula $RCOOC_2H_4SO_3H$ and $ROOC$—$CH_2$—$SO_3H$, wherein R is an alkyl group having from 1 to 20 carbon atoms such as dialkyl sulfosuccinates; ester salts with the general formula:

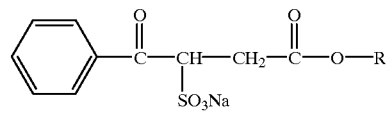

wherein R is an alkyl group having from 1 to 20 carbon atoms; alkaryl sulfonates in which the alkyl groups contain preferably from 10 to 20 carbon atoms, e.g. dodecylbenzenesulfonates, such as sodium dodecylbenzene-sulfonates; alkyl phenol sulfonates; sulfonic acids and their salts such as acids with the formula $RSO_3Na$, wherein R is an alkyl and the like; sulfonamides; sulfamido methylene-sulfonic acids; rosin acids and their soaps; sulfonates derivatives of rosin and rosin oil; and lignin sulfonates and the like.

Rosin acid soap has been used with good success at a concentration of about 5 percent by weight in the initial charge composition used in the synthesis of carboxylated elastomers. Of rosin acids, about 90 percent are isometric with abietic acid and the other 10 percent is a mixture of dehydro abietic acid and dihydro abietic acid.

The polymerization of this invention may be initiated using free radical catalysts, ultraviolet light or radiation. To ensure a satisfactory polymerization rate, uniformity and a controllable polymerization, free radical initiators are generally used. Free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzyl peroxide, decanolyl peroxide, lauroyl peroxide, cumene hydroperoide, p-menthane hydroperxodie, t-butylhydropeoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohyexyl sulfonyl peroxide and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane and the like; the various alkyl perkatals, such as 2,2-bis-(t-butylperoxy)butane, ethyl 3,3-bis(t-butylperoxy)butyrate, 1,1-di-(t-butyl-peroxy) cyclohexane and the like. Cumene hydroperoxide is a highly preferred initiator.

After the desired degree of monomer conversion has been attained a conventional shortstopping agent, such as hydroquinone, can be added to the polymerization medium to end the polymerization. The polymerization will typically be allowed to continue until a high level conversion has been achieved. In most cases the monomer conversion reached will be at least about 75 percent with monomer conversions of at least about 80 percent being preferred.

After the polymerization has been completed the latex will typically have a pH which is within the range of about 3 to about 4. At pH values of less than about 4 saponified oligomerized fatty acids are only marginally soluble in latex. At lower pH levels saponified oligomerized fatty acids are converted to free acids which are insoluble in water. Accordingly the pH of the latex will typically be adjusted to a level above about 4 by the addition of a base, such as ammonium hydroxide, sodium hydroxide, or potassium hydroxide.

After the pH of the latex has been increased to a level of greater than 4 one or more saponified oligomerized fatty acids are added to the latex. Measures should be taken to insure that the saponified oligomerized fatty acids are well distributed throughout the latex. The saponified oligomerized fatty acids can be added to the latex just before coagulation if sufficient time is allowed for proper mixing to result.

In most cases from about 0.1 phr (parts per hundred parts of rubber) to about 7 phr of saponified oligomerized fatty acids will be distributed throughout the latex. It is typically preferred to add about 0.5 phr to about 3 phr of the saponified oligomerized fatty acids to the latex. As a general rule it is most preferred to distribute from about 0.7 phr to about 1.4 phr of the saponified oligomerized fatty acids throughout the latex.

The oligomerized fatty acids which can be use in the practice of this invention are normally oligomers of fatty acids which contain 18 carbon atoms, such as oleic acid and linoleic acid. The actual preparation, properties, and structures of dimerized $C_{18}$ fatty acids are described in U.S. Pat. No. 2,347,562 and Cowan, John C. and Wheeler, Donald H., "Linear Superpolymers from Dilinoleic Acid," *The Journal of the American Chemical Society*, Vol. 66. pages 84–88 (1944), both of which are incorporated herein by reference.

Several different grades of oligomerized $C_{18}$ fatty acids are available commercially which vary in monomer dimer and trimer content. For example, oligomerized acids are available from Emery Industries, Inc, under the trade name, Empol™. Empol 1010 contains 97 percent dimer acids and 3 percent trimer acids. Empol 1014 contains 95 percent dimer acids, 4 percent trimer acids and 1 percent of the fatty acid monomers. Empol 1016 contains 87 percent dimer acids, 13 percent trimer acids and a trace of monomer. Empol 1018 contains 83 percent trimer acids, 17 percent dimer acids and a trace of monomer. Empol 1041 contains 90 percent trimer acids and 10 percent dimer acids. Empol 1052 contains 40 percent diner acids and 60 percent trimer and polybasic acids. Trimerized $C_{18}$ fatty acids have a molecular weight of about 850 contain 54 carbon atoms and have three carboxyl groups.

Any combination of oligomers of fatty acids can be utilized in practicing this invention. On a molar basis or when compared on a weight basis, trimer acids are more effective than dimer acids as scorch inhibitors. Fatty acids containing 18 carbon atoms which are dimerized and trimerized into $C_{36}$ and $C_{54}$ dimer and trimer acids will normally be used since they are readily commercially available. However, the scope of dimerized and trimerized fatty acids useful as scorch inhibitors is not limited to dimerized and trimerized $C_{18}$ fatty acids, since undoubtedly $C_{12}$ and $C_{25}$ fatty acids which have been dimerized and/or trimerized will also provide scorch resistance to a greater or less extent. Fatty acids containing from 12 to 25 carbon atoms which are oligomerized will be useful as scorch inhibitors for carboxylated rubbers. The oligomerization of unsaturated fatty acids containing varying numbers of carbon atoms will produce oligomers that have good properties as scorch inhibitors. For example, the codimerization of a $C_{12}$ fatty acid with a $C_{25}$ fatty acid will produce a $C_{37}$ dimerized fatty acid that will be a good scorch inhibitor. Any combination of any or all of the aforementioned types of oligomers of fatty acids can be used to provide excellent scorch safety when distributed throughout a carboxylated rubber. However, it is generally preferred to use oligomerized fatty acids that are comprised predominantly of trimer acids (90 percent or more by weight) and minor amounts of dimer acids, polybasic acids and monomeric acids.

Oligomerized fatty acids are water insoluble materials. Thus, they must be saponified with a base to become soluble in water or in the carboxylated nitrile rubber. The oligomerized fatty acids can be readily saponified by reacting them with bases, such as aqueous potassium hydroxide, sodium hydroxide, or ammonium hydroxide to yield the water-soluble salt of the oligomerized fatty acid. These salts can then be further reacted with other bases, for example, calcium chloride to yield the calcium salt of the oligomerized fatty acids.

After the saponified oligomerized fatty acids are distributed throughout the latex the carboxylated nitrile rubber can be recovered by coagulation. This coagulation will result in the conversion of the saponified oligomerized fatty acids to free acids which are insoluble in the aqueous phase, but which will remain in the carboxylated nitrile rubber. The coagulation is accomplished by adding to the latex at least one strong inorganic acid, calcium chloride, and at least one organic acid which contains at least three carboxyl groups. The strong inorganic acid will typically be sulfuric acid and the organic acid will typically be citric acid. The calcium chloride will normally be added in an amount which is within the range of about 13 phr to about 40 phr.

The organic acid will normally be added to the latex in an amount whereby from about 1 phr to about 10 phr of the organic acid will be present in the dry carboxylated nitrile rubber after coagulation. However, the organic acid can be added in whole or in part to the dry carboxylated nitrile rubber (after coagulation) to realize the desired quantity of the organic acid in the dry rubber. As a general rule, it is preferred for about 1.5 phr to about 5 phr of the organic acid to be present in the carboxylated nitrile rubber. It is normally more preferred for about 2 phr to about 4 phr of the organic acid to be present in the carboxylated nitrile rubber.

After coagulation washing can be employed to remove excess soap and/or electrolyte from the carboxylated nitrile rubber. Sometimes washing is also useful in adjusting the pH of the carboxylated elastomer that has been synthesized and recovered from the latex. After washing the carboxylated nitrile rubber will normally be dewatered using conventional techniques. It is then dried by employing standard procedures, such a passing warm dry air through it. After being dried it can be utilized as a base polymer in making photopolymer formulations for printing plates utilized in flexographic printing applications.

The ratio of bound monomers in the carboxylated nitrile rubber can vary from the monomer charge ratios utilized in the synthesis of the polymer due to differences in the polymerization rates of the monomers. Thus, the carboxylated nitrile rubber can have a different ratio of repeat units which are derived from the various monomers than was utilized in the monomer charge. In any case, the carboxylated nitrile rubbers of this invention will typically have repeat units which are derived from about 30 weight percent to about 73 weight percent 1,3-butadiene monomer, from about 20 weight percent to about 50 weight percent acrylonitrile monomer, and from about 7 weight percent to about 20 weight percent methacrylic acid. The carboxylated nitrile rubbers of this invention will more typically have repeat units which are derived from about 46 weight percent to about 62 weight percent 1,3-butadiene monomer, from about 28 weight percent to about 36 weight percent acrylonitrile monomer, and from about 10 weight percent to about 18 weight percent methacrylic acid. The carboxylated nitrile rubbers of this invention will preferably have repeat units which are derived from about 50 weight percent to about 58 weight percent 1,3-butadiene monomer, from about 30 weight percent to about 34 weight percent acrylonitrile monomer, and from about 12 weight percent to about 16 weight percent methacrylic acid.

This invention is illustrated by the following examples which are merely for the purpose of illustration and are not to be regarded as limiting the scope of the invention or the manner in which it can be practiced. Unless specifically indicated otherwise, parts and percentages are given by weight.

COMPARATIVE EXAMPLE 1

In this experiment a carboxylated nitrile rubber was synthesized and coagulated for comparative purposes. The charge composition used in the synthesis of this carboxylated nitrile rubber included 200 parts of deionized water, 0.3 parts of sodium acid phosphate, 0.1 parts of tetrasodium ethylene diamine tetraacetate, 1.0 parts of Empol® 1022 oligomerized fatty acid, 1.5 parts of dodecylbenzene sulfonic acid, 0.5 parts of the sodium salt of a condensed naphthalene sulfonic acid, 0.45 parts of a 30% by weight aqueous ammonium hydroxide solution, 7 parts of methacrylic acid, 0.45 parts of tertiary dodecylmercaptan, 27 parts of acrylonitrile, 0.03 parts of cumene hydroperoxide, 66 parts of 1,3-butadiene, 0.02 parts of sodium formaldehyde sulfoxylate, and 0.03 parts of chelated ferrous sulfate. In the preparation of this charge composition the Empol® 1022 oligomerized fatty acid, the dodecylbenzene sulfonic acid, the sodium salt of a condensed naphthalene sulfonic acid, and the 30% by weight aqueous ammonium hydroxide solution were premixed with 196 parts of deionized water and allowed to react for 15 minutes before adding the other components of the charge composition. The sodium formaldehyde sulfoxylate and chelated ferrous sulfate activators were premixed in a separate vessel in four parts of deionized water before they were added to the main reaction vessel and mixed with the other components in the charge composition.

This polymerization was run in a 75.7 liter reactor with agitation by two 15.2 cm Brumagim mixers at 300 rpm's (revolutions per minute). This polymerization was run at a temperature of 10° C. This temperature was maintained for 25 hours at which time the solid content of the emulsion had reached 27.6 percent. At this point, the reaction had reached approximately 80 percent conversion and 0.1 parts of sodium nitrite was added as a shortstop. The emulsion was then degassed to remove unpolymerized butadiene monomer that was present. This degassing was accomplished by applying 50.8 cm of vacuum to the emulsion for 10 hours.

Sixty pounds (27.2 kilograms) of this latex and 625 grams of a 25 percent Agerite Geltrol (a modified high molecular weight hindered phenol antioxidant available from the R. T. Vanderbilt Company, Inc) emulsion were slowly added to a vigorously agitated solution of 600 pounds (272 kilograms) of water at 60° C., 180 grams of concentrated sulfuric acid and 150 grams of Nalco™ 108 (polyelectrolyte to coagulate the latex. A yield of 7.7 kilograms of dried rubber was recovered.).

Nalco™ 108 is a commercially available polyelectrolyte with the structural formula:

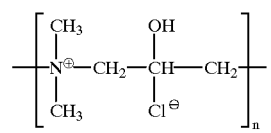

wherein n is an integer varying from about 2 to 15. Nalco™ 108 polyelectrolyte has a molecular weight ranging from about 200 to about 2000.

Nalco 108 polyelectrolyte is prepared by reacting epichlorohydrin with dimethylamine. Minor amounts of a compound with the structural formula:

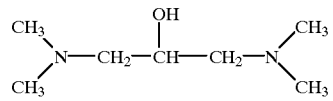

is also believed to be present in Nalco 108. The wet rubber crumb was dewatered and oven-dried.

The clarity of the carboxylated nitrile rubber recovered was not good. It also has water swell characteristics which were not suitable for utilization as a base polymer in making photopolymer formulations for printing plates utilized in flexographic printing applications. More specifically, the carboxylated nitrile rubber made exhibited a volume swell after water aging of only 8.5 percent.

COMPARATIVE EXAMPLE 2

In this experiment a carboxylated nitrile rubber having a bound methacrylic acid contant of about 14 percent was synthesized. The procedure employed was similar to the procedure described in Example 1. However, some major modifications were made. More specifically, the level of acrylonitrile in the polymer was increased to 40 percent and the level of methacrylic acid was increased to 14 percent. Accordingly, in the procedure implemented the amount of acrylonitrile included in the charge composition was increased to 40 parts, the level of methacrylic acid was increased to 14 parts, and the level of 1,3-butadiene was reduced to 46 parts. The mixture of coagulating agents was also modified by eliminating the Nalco™ 108 polyelectrolyte. Also, the level of calcium chloride was increases from 20 phr to 26.6 phr and the level of sulfuric acid was decreased from 2.6 phr to 1.5 phr.

The carboxylated nitrile rubber made by this procedure was much better than the rubber made in Example 1 for utilization as a base polymer in making photopolymer formulations for printing plates utilized in flexographic printing applications. This is because it exhibited much better clarity and because it was much more water sensitive. More specifically, the carboxylated nitrile rubber made in Example 1 was depicted as having fair clarity and the rubber made in this experiment was depicted as having excellent clarity. The volume swell of the polymer synthesized in Example 1 after water aging was only 8.5 percent. The rubber made in this experiment had a greatly improved volume swell after water aging of 28.9 percent. However, the Mooney ML-4 viscosity of the rubber made in this experiment was mush too high (approximately 90).

EXAMPLES 3–4

In this experiment a carboxylated nitrile rubber was synthesized utilizing the techniques of this invention. The procedure employed was similar to the procedure described in Example 2 except for the fact that 0.6 phr or 2.0 phr of citric acid was added to the latex before coagulation in Examples 3 and 4, respectively. The citric acid reduced the Mooney ML-4 viscosity of the rubber to 49 at the 0.6 phr level and further reduced the Mooney ML-4 viscosity of the rubber to 40 at the 2.0 phr level.

The citric acid proved to reduce the Mooney ML-4 viscosity of the carboxylated nitrile rubber without having an adverse effect on clarity or water swell characteristics. In fact, the clarity of the rubber samples synthesized in these experiments were depicted as being excellent. The rubber made in Example 3 showed a volume swell after water aging of 54 percent and the rubber made in Example 4 showed a volume swell after water aging of 104 percent. It should be noted that a volume swell of greater than about 40 percent is considered to be good. The volume swell determinations made in these experiments were made after the rubber samples were aged in water for 24 hours.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A process for preparing a high clarity water-sensitive carboxylated nitrile rubber composition which comprises the steps of (1) free radical polymerizing from about 30 weight percent to about 73 weight percent 1,3-butadiene, from about 20 weight percent to about 50 weight percent acrylonitrile and from about 7 weight percent to about 20 weight percent methacrylic acid in an aqueous polymerization medium in the presence of at least one emulsifier to produce a carboxylated nitrile rubber latex; (2) adjusting the pH of the carboxylated nitrile rubber latex to above 4 by the addition of a base to produce a pH-adjusted carboxylated nitrile rubber latex; (3) distributing at least one saponified oligomerized fatty acid throughout the pH-adjusted carboxylated nitrile rubber latex to produce a saponified oligomerized fatty acid containing pH-adjusted carboxylated nitrile rubber latex; (4) coagulating the saponified oligomerized fatty acid containing pH-adjusted carboxylated nitrile rubber latex by the addition of a combination of coagulating agents which consists essentially of at least one strong inorganic acid, calcium chloride and citric acid, to separate wet carboxylated nitrile rubber composition from an aqueous phase; and (5) drying the wet carboxylated nitrile rubber composition to produce said high clarity water-sensitive carboxylated nitrile rubber composition.

2. A process as specified in claim 1 wherein the strong inorganic acid is sulfuric acid.

3. A process as specified in claim 2 wherein from about 0.1 phr to about 7 phr of the saponified oligomerized fatty acid is distributed throughout the pH adjusted carboxylated nitrile rubber in step (3).

4. A process as specified in claim 3 wherein said free radical polymerization is conducted at a temperature which is within the range of about 5° C. to about 60° C.

5. A process as specified in claim 4 wherein from about 40 weight percent to about 52 weight percent 1,3-butadiene, from about 36 weight percent to about 44 weight percent acrylonitrile, and from about 12 weight percent to about 16 weight percent methacrylic acid are free radical terpolymerized in step (1).

6. A process as specified in claim 5 wherein from about 1 phr to about 10 phr of the citric acid is utilized in the combination of coagulating agents employed in step (4).

7. A process as specified in claim 6 wherein from about 0.5 phr to about 3 phr of the saponified oligomerized fatty acid is distributed throughout the pH adjusted carboxylated nitrile rubber in step (3).

8. A process as specified in claim 7 wherein said free radical polymerization is conducted at a temperature which is within the range of about 15° C. to about 30° C.

9. A process as specified in claim 8 wherein from about 43 weight percent to about 49 weight percent 1,3-butadiene, from about 38 weight percent to about 42 weight percent acrylonitrile, and from about 13 weight percent to about 15 weight percent methacrylic acid are free radical terpolymerized in step (1).

10. A process as specified in claim 1 wherein from about 0.5 phr to about 6 phm of the emulsifier is present during the emulsion polymerization.

11. A process as specified in claim 10 wherein the polymerization is conducted at a temperature which is within the range of about 0° C. to about 100° C.

12. A process as specified in claim 11 wherein the citric acid is added in an amount which is within the range of about 1.5 phr to about 5 phr.

13. A process as specified in claim 12 wherein from about 1 phr to about 5 phm of the emulsifier is present during the emulsion polymerization.

14. A process as specified in claim 13 wherein the polymerization is conducted at a temperature which is within the range of about 5° C. to about 60° C.

15. A process as specified in claim 14 wherein the citric acid is added in an amount which is within the range of about 2 phr to about 4 phr.

16. A process as specified in claim 15 wherein from about 2 phr to about 4 phm of the emulsifier is present during the emulsion polymerization.

17. A process as specified in claim 16 wherein the polymerization is conducted at a temperature which is within the range of about 15° C. to about 30° C.

18. A process as specified in claim 12 wherein the strong inorganic acid is sulfuric acid.

19. A process as specified in claim 18 wherein from about 40 weight percent to about 52 weight percent of the 1,3-butadiene, from about 36 weight percent to about 44 weight percent of the acrylonitrile and from about 12 weight percent to about 16 weight percent of the methacrylic acid are free radical terpolymerized in step (1).

20. A process as specified in claim 16 wherein from about 43 weight percent to about 49 weight percent of the 1,3-butadiene, from about 38 weight percent to about 42 weight percent of the acrylonitrile and from about 13 weight percent to about 15 weight percent of the methacrylic acid are free radical terpolymerized in step (1).

* * * * *